(12) United States Patent
Walker et al.

(10) Patent No.: US 7,680,420 B1
(45) Date of Patent: Mar. 16, 2010

(54) OPTICAL E-FIELD MODULATION USING A DIRECTLY DRIVEN LASER

(75) Inventors: Dave Walker, Ottawa (CA); Kim B. Roberts, Nepean (CA); Maurice O'Sullivan, Ottawa (CA); Leo Strawczynski, Ottawa (CA); James Whiteaway, Sawbridgeworth (GB); Christopher Fludger, Great Shelford (GB); Han Henry Sun, Ottawa (CA); Adrien Comeau, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 972 days.

(21) Appl. No.: 10/872,850

(22) Filed: Jun. 21, 2004

Related U.S. Application Data (63) Continuation-in-part of application No. 10/677,223, filed on Oct. 3, 2003, now Pat. No. 7,023,601.

(51) Int. Cl.
*H04B 10/00* (2006.01)

(52) U.S. Cl. .................. 398/183; 398/186; 398/188

(58) Field of Classification Search .......... 398/182–201
See application file for complete search history.

(56) References Cited

U.S. PATENT DOCUMENTS

| | | | |
|---|---|---|---|
| 5,148,503 A | 9/1992 | Skeie | |
| 5,311,346 A | 5/1994 | Haas et al. | |
| 5,349,312 A | 9/1994 | Huettner et al. | |
| 5,408,498 A | 4/1995 | Yoshida | |
| 5,416,626 A | 5/1995 | Taylor | |
| 5,446,574 A | 8/1995 | Djupsjobacka et al. | |
| 5,513,029 A | 4/1996 | Roberts | |
| 5,579,328 A | 11/1996 | Habel et al. | |
| 5,761,225 A | 6/1998 | Fidric et al. | |
| 5,892,858 A | 4/1999 | Vaziri et al. | |
| 5,949,560 A | 9/1999 | Roberts et al. | |
| 5,999,258 A | 12/1999 | Roberts | |
| 5,999,300 A * | 12/1999 | Davies et al. | 398/185 |
| 6,067,180 A | 5/2000 | Roberts | |
| 6,115,162 A | 9/2000 | Graves et al. | |

(Continued)

FOREIGN PATENT DOCUMENTS

EP 0 524 758 1/1993

(Continued)

OTHER PUBLICATIONS

WillCocks et al, Electronic Dsieprsion Compensation Steps up to 10-Gbit/s Link Challenges, www.commsdesign.com, Jan. 14, 2004, pp. 1-6.*

(Continued)

*Primary Examiner*—Agustin Bello
(74) *Attorney, Agent, or Firm*—Pearne Gordon LLP (57) ABSTRACT

A method of synthesizing a modulated optical signal using a laser cascaded with an amplitude modulator. A phase drive signal $V_F(t)$ is derived for driving the laser to generate an optical carrier signal with a desired phase $\phi(t)$. An amplitude drive signal $V_S(t)$ is then derived for driving the amplitude modulator to impose a desired amplitude S(t) onto the optical carrier signal generated by the laser. The amplitude drive signal $V_S(t)$ is compensated for amplitude modulation of the optical carrier signal generated by the laser.

10 Claims, 7 Drawing Sheets

U.S. PATENT DOCUMENTS

| | | | |
|---|---|---|---|
| 6,124,960 | A | 9/2000 | Garthe et al. |
| 6,128,111 | A | 10/2000 | Roberts |
| 6,205,262 | B1 | 3/2001 | Shen |
| 6,262,834 | B1 | 7/2001 | Nichols et al. |
| 6,304,369 | B1 | 10/2001 | Piehler |
| 6,441,932 | B1 | 8/2002 | Helkey |
| 6,473,013 | B1 | 10/2002 | Velazquez et al. |
| 6,559,994 | B1 | 5/2003 | Chen et al. |
| 6,580,532 | B1 | 6/2003 | Yao et al. |
| 2001/0028760 | A1 | 10/2001 | Yaffe |
| 2002/0018268 | A1 | 2/2002 | Price et al. |
| 2002/0024694 | A1 | 2/2002 | Newell et al. |
| 2002/0106148 | A1 | 8/2002 | Schemmann et al. |
| 2003/0011847 | A1 | 1/2003 | Dai et al. |
| 2004/0179844 | A1* | 9/2004 | Chung et al. .................. 398/82 |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Adaptive Electronic Linearization of Fiber Optic Links, OFC 2003, vol. 2, pp. 477-480, Mar. 2003 Sadhwani et al.

Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez at al.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alferness.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 -m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Representation of Second-Order Polarisation Mode Dispersion, Electronics Letters, vol. 35, No. 19, Sep. 16, 1999, A. Eyal et al.

Signal Distortion and Noise in AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

H. Gysel et al. "Electrical Predistortion to Compensate for Combined Effect of Laser Chirp and Fibre Dispersion", Electronics Letters IEE Stevenage vol. 27, No. 5, Feb. 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

Ram Sadhwani, Adaptive CMOS Predistortion Linearizer for Fiber-Optic Links, Journal of Lightwave Technology, vol. 21, No. 12, Dec. 2003.

P.S. Andre, et al.; "Extraction of DFB Laser Rate Equation Parameters for Optical Simulation Pusposes", Conftele 1999 ISBN 972-98115-0-4.

Lucas Illing, et al., "Shaping Current Waveforms for Direct Modulation of Semiconductor Lasers", Institute for Nonlinear Science, U.C. San Diego 2003.

Kamoto, T. et al "An 8-bit 2-ns Monolithic DAC", IEEE Journal of Solid-State Circuits, Feb. 1988, vol. 23, No. 1.

Kim, Hoon et al "10 Gbit/s 177 km transmission over conventional singlemode fibre using a vestigial side-band modulation format", Electronics Letters, Dec. 6, 2001, pp. 1533.

Sieben, M. et al "10Gbit/s optical single sideband system", Electronics Letters, May 22, 1997, pp. 971-973, vol. 33, No. 11.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

* cited by examiner

OPTICAL E-FIELD MODULATION USING A DIRECTLY DRIVEN LASER

CROSS-REFERENCE TO RELATED APPLICATIONS

This application is a Continuation in Part of Applicant's U.S. patent application Ser. No. 10/677,223, filed on Oct. 3, 2003, and entitled "Optical E-Field Modulation Using A Mach-Zehnder Interferometer", which issued to U.S. Pat. No. 7,023,601 on Apr. 4, 2006.

This application also claims priority of Applicant's co-pending International Patent Application No. PCT/CA03/01044 filed Jul. 11, 2003.

MICROFICHE APPENDIX

Not Applicable.

TECHNICAL FIELD

The present invention relates to optical signal transmitters for optical communications systems, and in particular to optical E-field modulation using a directly driven laser.

BACKGROUND OF THE INVENTION

Figure 1A:
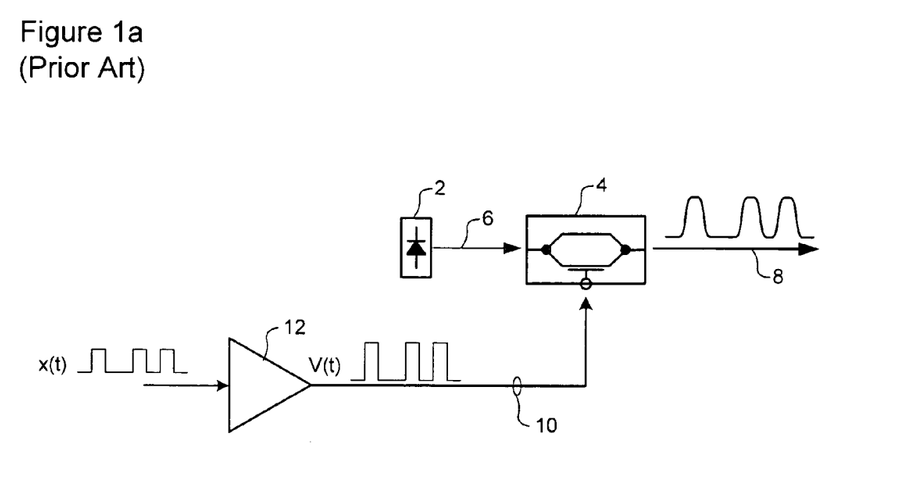
FIGS. 1a-1b schematically illustrate principal components and operation of modulated optical signal synthesizers known in the prior art.

In the optical communications space, various techniques are used to synthesize an optical communications signal for transmission. A popular technique utilizes a laser 2 coupled to an external optical modulator 4, as shown in FIG. 1a. The laser 2 generates a narrow-band continuous wave (CW) optical carrier signal 6 having a desired wavelength. The optical modulator 4 operates to modulate the amplitude and/or phase of the carrier signal 6 to generate the optical communications signal 8 based on a drive signal 10 that encodes data to be transmitted. Typically, the drive signal 10 is generated by a driver circuit 12 based on an input data signal x(t).

In the arrangement illustrated in the FIG. 1a, the optical modulator 4 is provided by a well known Mach-Zehnder (MZ) interferometer. Other types of modulators may be used, depending on the desired type of modulation. For example, an electro-absorptive modulator (EAM) or a variable optical attenuator (VOA) may be used for amplitude modulation; whereas phase shifters are well known for implementing phase modulation. In each case, the driver circuit 12 generates the drive signal 10 by scaling the input data signal x(t) to satisfy the voltage and current requirements of the modulator 4. The driver circuit 12 may also generate one or more bias signals (not shown) for controlling a bias point of the modulator 4 in a manner well known in the art.

Figure 1B:
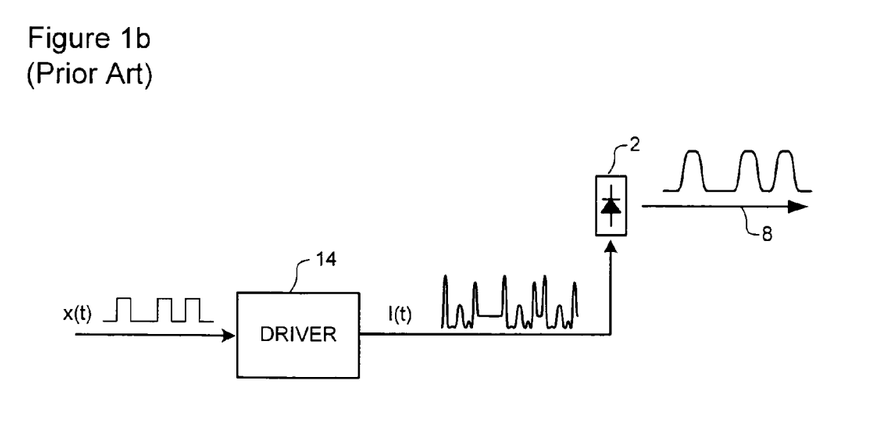

An alternative approach is to directly modulate the laser itself. As is well known in the art, a conventional semiconductor laser exhibits responses, in both amplitude and frequency (wavelength), to an input drive current. Both of these responses can be modeled using respective transfer functions. The paper "Shaping Current Waveforms for Direct Modulation of Semiconductor Lasers", Illing et al., Institute for Non-Linear Science, U.C. San Diego, 2003, describes a method and system for directly driving a laser to generate an amplitude modulated optical signal. In this case, the problem is to define a drive current which causes the laser output to "cleanly" transition between high and low output levels (respectively representing binary '0' and '1'). This is achieved by deriving a model (transfer function) of the amplitude response of the laser, which accounts for delayed effects of population inversion. The inverse of the transfer function can then be applied to the input signal x(t) to obtain a drive current I(t), using a driver 14, which will produce the desired laser output, as may be seen in FIG. 1b.

A limitation of this approach is that it considers only the amplitude response of the laser. As is known in the art, semiconductor lasers exhibit chirp, which is a variation in the output wavelength (frequency) with the drive current level. As a result, modulation of the drive current produces corresponding variations in the output wavelength, in addition to the desired amplitude modulation.

Chirp is a product of laser carrier dynamics, principally the resultant effective refractive index of the laser's gain region as a function of carrier density. Due to the interaction between the optical signal within the laser cavity and optical gain (due to the population inversion associated with injected carriers) the optical signal is frequency modulated as the electrical drive current is modulated. In the presence of non-zero optical fiber dispersion, chirp of a directly modulated laser causes inter-symbol interference (ISI) that is a function of propagation distance. This problem means that the signal reach is not just a function of the laser's amplitude fidelity but also the accompanying chirp. The greater the chirp, the greater the ISI for a given propagation distance.

An additional limitation of the Illing et al. paper is that it only provides a method of transitioning the laser output between a pair of stable amplitude values (i.e. binary '0' and '1'). As may be appreciated, this requires a bi-stable response with an acceptable noise figure. However, in some cases, it is necessary to obtain a fully linear response. For example, Applicant's co-pending U.S. patent application Ser. Nos. 10/262,944, filed Oct. 3, 2002; 10/307,466 filed Dec. 2, 2002; and 10/405,236 filed Apr. 3, 2003; and International Patent Application No. PCT/CA03/01044 filed Jul. 11, 2003 describe techniques for compensating impairments in an optical link by predistoring an input signal, in the electrical domain, and then using the thus predistorted signal to drive optical modulation. As described in those applications, successful implementation of this technique, particularly for the case of polarisation dependent and non-linear impairments, requires continuous (that is, analog) modulation of both the amplitude and phase of a CW optical carrier. Stated more generally, it is desirable to arbitrarily modulate the E-field of the CW carrier, within the complex plane.

Figure 2:
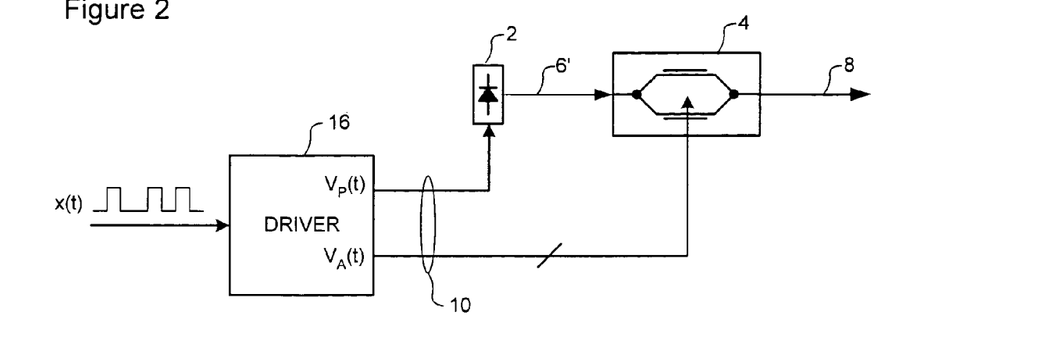
FIG. 2 schematically illustrates principal components of a complex communications signal synthesizer in accordance with an embodiment of the present invention.

As mentioned in the above-referenced co-pending applications, one method of accomplishing this result is to use a directly driven laser cascaded with an amplitude modulator (e.g. a conventional Mach-Zehnder interferometer), as shown in FIG. 2. This approach exploits chirp to produce a phase-modulated optical carrier, which can then be amplitude modulated by the MZ modulator. In this case, the driver circuit must generate a pair of drive signals in the form of amplitude and phase (or, equivalently, frequency) signal components $V_S(t)$ and $V_P(t)$. The amplitude component $V_S(t)$ drives the amplitude modulator 4 to modulate the amplitude of the CW carrier signal 6 in a conventional manner. The frequency component $V_P(t)$ provides the laser drive current, and is varied to induce desired excursions of the laser output phase.

In principle, this technique enables E-field modulation of the CW carrier within the complex polar-coordinate (Amplitude-Phase) plane, limited primarily by the frequency response of the laser 2. However, actually achieving this result requires that the amplitude and phase must be independently controlled. Since a semiconductor laser exhibits both chirp and amplitude modulation in response to drive current modulation, it is not possible to decouple the phase and amplitude modulation of the laser output.

Accordingly, methods and apparatus for cost-effectively synthesizing a modulated optical signal using a directly driven laser remains highly desirable.

SUMMARY OF THE INVENTION

An object of the present invention is to provide a method for cost-effectively synthesizing a modulated optical signal using a directly driven laser.

Accordingly, an aspect of the present invention provides a method of synthesizing a modulated optical signal using a laser cascaded with an amplitude modulator. A phase drive signal $V_P(t)$ is derived for driving the laser to generate an optical carrier signal with a desired phase $\phi(t)$. An amplitude drive signal $V_S(t)$ is then derived for driving the amplitude modulator to impose a desired amplitude S(t) onto the optical carrier signal generated by the laser.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and apparatus for directly driving a laser to produce a desired optical waveform which, when subjected to distortions of an optical link, will exhibit an open eye at a receiver end of the link. Embodiments of the invention are described below, by way of example only, with reference to FIGS. 2-7.

For the purposes of understanding the present invention, it is useful to consider a representation of the total optical electric field (E-field–E(t)) as a vector confined to a plane and emanating from a fixed origin, where the length of the vector gives the amplitude of the E-field at any instant (t), and the direction of the vector gives the phase of the field at any instant (t). Within this construction, we consider two basis sets. The first basis set is a Cartesian coordinate system centered on the E-field origin. In this Cartesian representation, the total E-field E(t) is decomposed along the orthogonal In-Phase (I) and Quadrature (Q) directions. The second basis set is a polar coordinate system, again sharing its origin with that of the E-field vector. In this polar representation, the E-field is decomposed into vector length (that is, the amplitude S) and phase angle ($\phi$) relative to the I direction. These two basis sets are related by a non-linear transformation, in a manner well known in the art. In each of these representations, the time-sequence of loci of the end-point of the E-field vector is referred to as a trajectory of the E-field.

In general, the present invention operates by deriving a target signal which defines a desired optical waveform. This desired waveform is composed such that, as the waveform traverses an optical link, impairments of the link will produce an open eye at a receiving end of the link. The first drive signal is then used to derive a drive signal which, when applied to a laser will generate an optical output waveform which is a high-fidelity reproduction of the desired waveform.

As shown in FIG. 2, a system in accordance with a first embodiment of the present invention comprises a complex driver circuit 16 and a semiconductor laser 2 cascaded with a conventional amplitude modulator 4. In operation, the complex driver circuit 16 generates a pair of independent drive signals $V_P(t)$ and $V_S(t)$, which are respectively used to drive the laser 2 and the amplitude modulator 4. This operation is designed to exploit chirp to generate a phase modulated CW optical carrier 6' signal having the desired phase $\phi(t)$. The amplitude modulator is driven to amplitude modulate the CW optical carrier 6' to generate the communication signal 8 having the desired amplitude modulation S(t).

The amplitude modulator 4 may conveniently be provided as a conventional "dual branch" Mach-Zehnder (MZ) interferometer. In this case, the drive signal $V_S(t)$ is provided as a differential pair of signals which drive respective branches of the MZ interferometer. As is well known in the art, this arrangement enables a high degree of amplitude control of the recombined lightwave (communications signal) 8 emerging from the MZ modulator 4. Undesired chirp induced by operation of the MZ modulator 4 can be substantially eliminated by adjusting a phase relationship between the differential signal pair, in a manner known in the art. Alternatively, the amplitude modulator 4 may be provided as a conventional electroabsorptive device or a Variable Optical Attenuator (VOA).

Figure 3A:
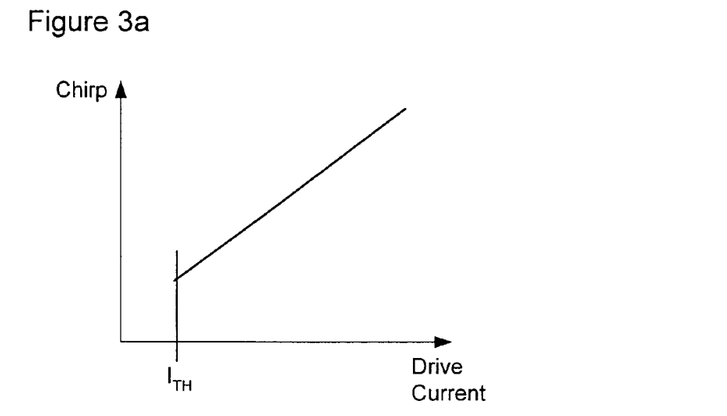
FIGS. 3a-3b respectively illustrate a chirp and phase response of a laser usable in the embodiment of FIG. 2.
Figure 3B:
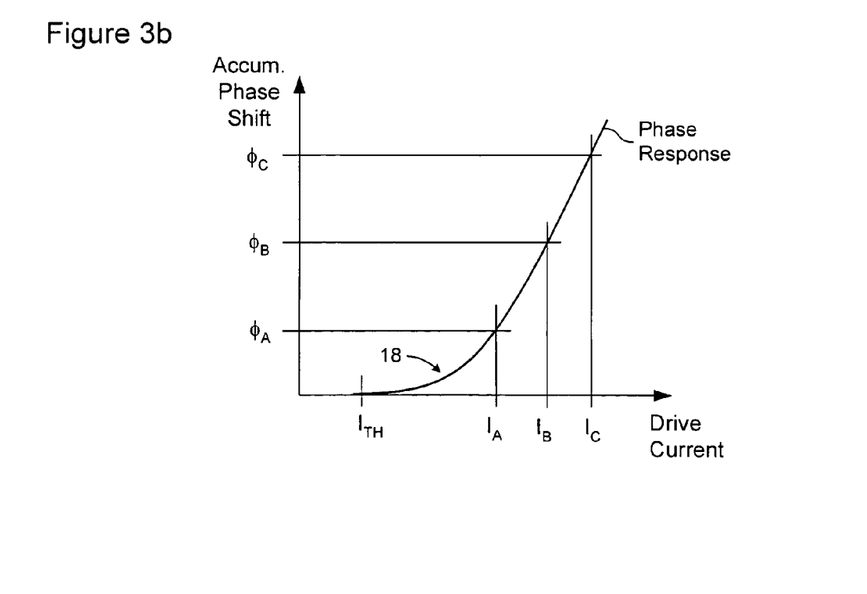

As is known in the art, conventional semi-conductor lasers exhibit chirp, which is a deviation in the laser output wavelength (or, equivalently, frequency) relative to some reference wavelength, as a function of drive current. Typically, chirp is characterised in terms of MHz/mA, and is substantially linear above the threshold current $I_{TH}$ (i.e. the current at which the laser begins to emit light), as may be seen in FIG. 3a. In the present invention, this characteristic is used to implement phase control of the CW signal 6' emitted by the laser 2. In particular, since frequency is the time-derivative of phase, it is a simple matter to use the chirp characteristic to compute a frequency deviation of the laser output, relative to a selected reference frequency, as a function of drive current; and then integrate this frequency deviation over an appropriate time interval to derive a phase response of the laser. This phase response may conveniently be defined in terms of the an accumulated phase shift as a function of the drive current, as shown in FIG. 3b. Since chirp is substantially linear, the phase response may nominally be characterised as a quadratic function of the drive current. As may be seen in FIG. 3b, the phase response exhibits a relatively severe "knee" 18 close to the threshold current $I_{TH}$. However, at drive current values above about $3.5 \times I_{TH}$, the phase response is approximately linear. Thus it is possible to define a range of drive current values, lying between a lower limit of about $3.5 \times I_{TH}$ and the maximum permissible current of the laser 2, within which a substantially linear phase response can be obtained. This arrangement is illustrated in FIG. 3b, in which the drive current is varied about a bias current $I_B$ between lower and upper limits $I_A$ and $I_C$, respectively. In response to this variation in the drive current, the CW optical signal 6' emitted by the laser will exhibit phase excursions between $\phi_A$ and $\phi_C$, about bias point $\phi_B$.

Based on the foregoing, it will be apparent that a phase transfer function $T_P$ can be defined which computes a drive signal $V_P(t)$ required to obtain a laser output phase $\phi(t)$ corresponding to desired target phase P(t). Thus:

$$V_P(t)=T_P[P(t)] \qquad \text{(Eq. 1)}$$

Various methods may be used to accomplish this result. For example, the laser may be modeled analytically using well known rate equations, which can then be solved for the output phase. This is directly analogous to the approach used by Illing et al, (Supra) to derive the drive current required to obtain a bistable amplitude modulation response. The publication "Extraction of DFB Laser Rate Equations Parameters for Optical Simulation Purposes", P. S. Andre et al., Proceedings of SPIE, vol. 3572, pp 141-146, August 1999, provides a detailed description of this technique. Another method is to directly measure the transfer function using methods well known in the art.

Alternatively, known adaptive techniques may be used to derive the phase transfer function T. For example, the laser can be driven (using either a predetermined "test" drive signal, or a "live" data signal) while recording the target phase P(t) and laser output phase $\phi(t)$ in the time domain. Comparison between the target and output phases P(t) and $\phi(t)$ can then be used to adaptively determine a finite impulse response (FIR) filter function that renders the output phase $\phi(t)$ substantially identical to the target phase P(t). This FIR filter represents the inverse impulse response of the laser. Consequently, when the target phase P(t) is passed through this FIR filter, the filter output represents the drive signal $V_P(t)$ required to obtain the desired laser output phase $\phi(t)$. This technique is advantageous in that it automatically takes into account time-domain effects, such as population inversion, and any manufacturing variations in the drive circuit 16 and laser 2, which might not be fully accounted for in an analytical model.

As mentioned above, phase modulation of the laser output 6' will inherently be accompanied by an amplitude modulation A(t). As is well known in the art, this amplitude modulation A(t) can readily be modeled, as a function of the laser drive signal $V_P(t)$, using an amplitude transfer function $T_A$. Thus:

$$A(t)=T_A[V_P(t)] \qquad \text{(Eq. 2)}$$

Clearly, the amplitude transfer function $T_A$ can be derived using any of the analytical or adaptive techniques described above. The amplitude transfer function $T_A$ can be used to calculate the laser amplitude modulation A(t) obtained for a desired target phase P(t). The amplitude modulation S'(t) that must be impressed onto the optical signal 6' emitted by the laser 2 can then be calculated by extracting the laser amplitude modulation A(t) from the desired target amplitude S(t) of the communications signal 8. Thus:

$$S'(t) = \frac{S(t)}{A(t)} \qquad \text{(Eq. 3)}$$

This required amplitude modulation S'(t) can then be used to determine the appropriate amplitude drive signal $V_S(t)$ using the known response of the amplitude modulator 4, in a manner well known in the art.

Those skilled in the art will appreciate that the above-described computations can be accomplished using known digital signal processing techniques. Principal components and operation of a complex driver circuit 16 capable of performing this operation are described below with reference to FIG. 4. A practical application of the system of FIG. 4, for compensating dispersion, is also described with reference to FIGS. 5a-5d.

Figure 4:
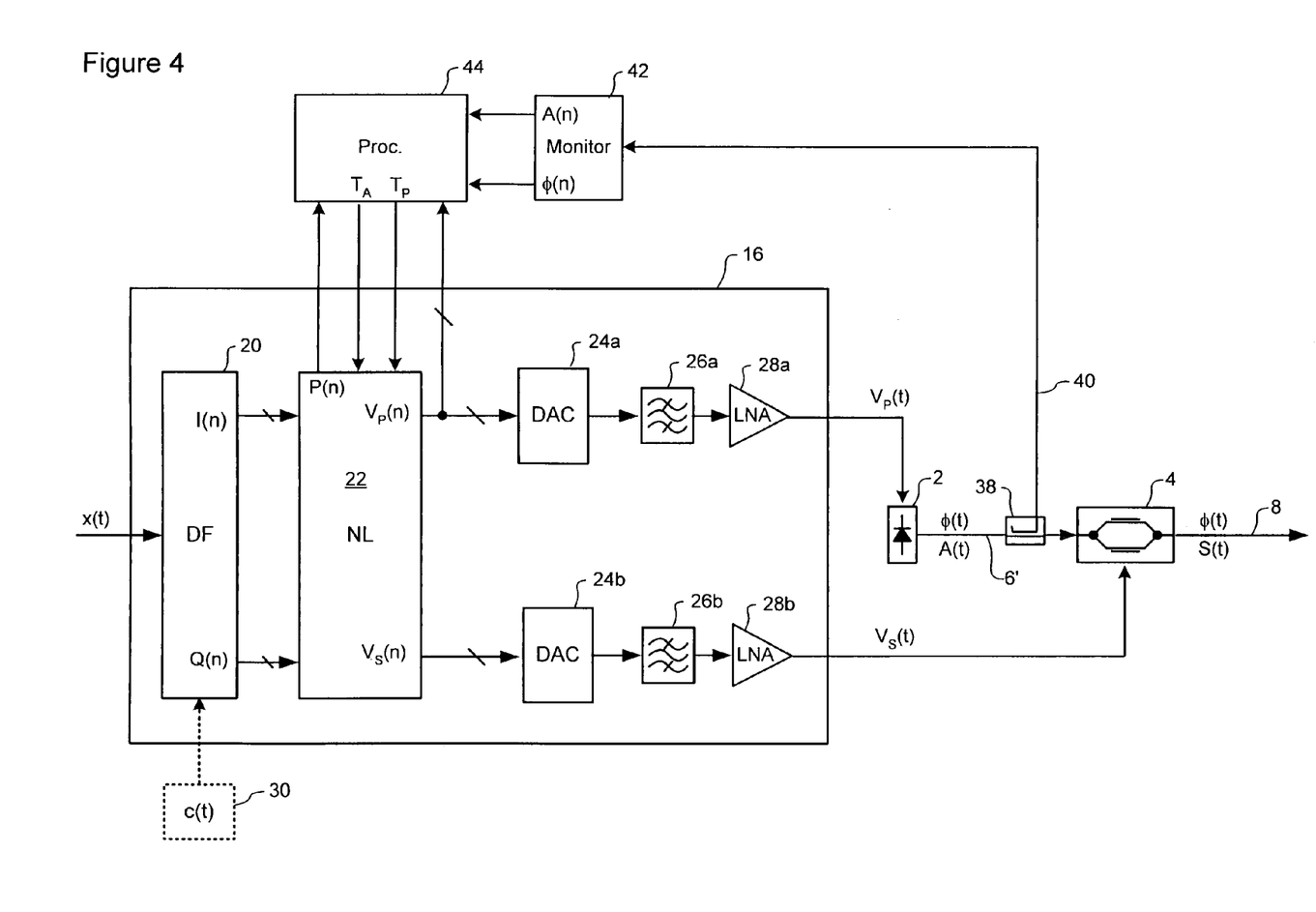
FIG. 4 illustrates principal components and operation of a driver circuit usable in the embodiment of FIG. 2.

In the embodiment of FIG. 4, the complex driver circuit 16 comprises a digital filter 20 cascaded with a non-linear compensator 22, which cooperate to generate successive digital sample, values $V_P(n)$ and $V_S(n)$. These digital sample values are then converted into corresponding analog signal levels by respective digital-to-analog converters (DACs) 24, filtered (at 26) to reduce out-of-band noise, and scaled by low noise amplifiers 28 to yield the drive signals $V_P(t)$ and $V_S(t)$. If desired, respective digital filters (not shown) may be positioned in each signal path between the non-linear compensator 22 and the DACs 24 in order to compensate any propagation delay differences.

Various known digital filter types may be used to implement the digital filter 20, such as, for example, Finite Impulse Response (FIR) filters, Infinite Impulse Response (IIR) filters, and Fast Fourier Transform (FFT filters). Alternatively, the digital filter 20 may be implemented using a Random Access Memory Look-up Table (RAM LUT). In either case, the digital filter 20 generates a first signal in the form of successive sample values I(n) and Q(n), which represent the desired communication signal (E-Field) waveform in Cartesian (i.e. In-phase and Quadrature) coordinates, at a sample rate which is about double the bit-rate of the input signal x(t). In a trivial case, this operation can be provided as a simple mapping function, which maps the input signal x(t) (FIG. 5a) onto the complex I-Q plane as may be seen in FIG. 5b, in which logical "0"s and "1"s of the input signal are shown mapped onto the I-axis. However, as described in applicant's co-pending U.S. patent application Ser. Nos. 10/262,944, filed Oct. 3, 2002; 10/307,466 filed Dec. 2, 2002; and 10/405,236 filed Apr. 3, 2003; and International Patent Application No. PCT/CA03/01044 filed Jul. 11, 2003, the digital filter 20 preferably also implements signal pre-distortion in accordance with a compensation function C(t) 30 which substantially compensates impairments of an optical communications link (not shown). In this case, the E-field E(t) will exhibit arbitrary excursions in the I-Q plane, and sample values I(n) and Q(n) generated by the digital filter 20 may be markedly different from either previous or successive values, as may be seen in FIG. 5c in which the shaded region 32 represents the range of I(n) and Q(n) valves generated by the digital filter 20.

Figure 5A:
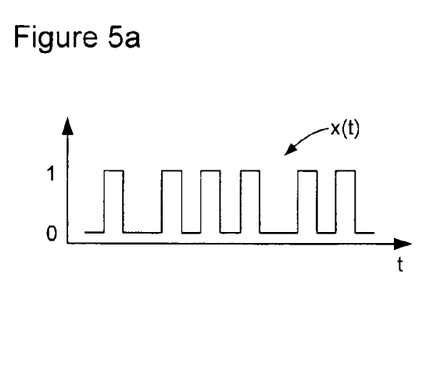
FIGS. 5a-5d schematically illustrate operation of the embodiment of FIG. 2.
Figure 5B:
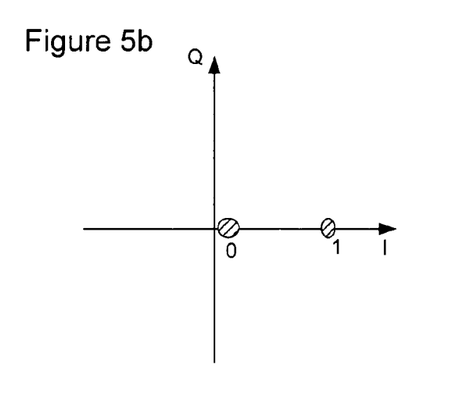
Figure 5C:
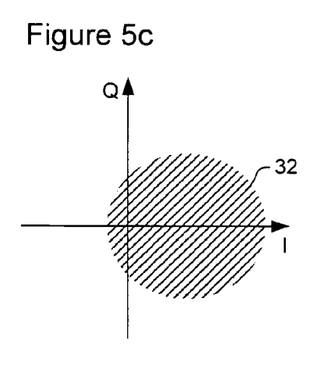
Figure 5D:
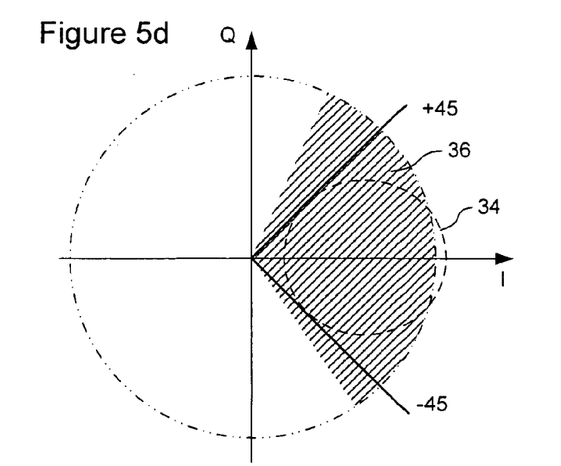

The non-linear compensator 22 processes the sample values I(n) and Q(n) to obtain the required drive signal values $V_P(n)$ and $V_S(n)$. Thus, the non-linear compensator 22 converts the Cartesian coordinate sample values I(n) and Q(n) into corresponding polar coordinate values S(n) and P(n), respectively representing the target amplitude S(t) and phase P(t) of the communications signal 8. In order to limit the drive voltage (and current) requirements of downstream components (primarily the DACs 24 and laser 2), these polar coordinate values S(n) and P(n) may be scaled and clipped to limit the output phase $\phi(t)$ to within a selected range of angles, and to limit the amplitude S(t) to an amplitude range corresponding to the minimum and maximum points of the amplitude modulator response curve. For example, the target phase P(n) may be scaled and clipped to limit the output phase $\phi(t)$ to a range of 90 degrees (i.e. ±45 degrees from the bias point) as shown in FIG. 5d. Within this range, the bias point will be selected such that the minimum drive current is greater than about 3.5×$I_{TH}$, in order to avoid severe non-linear phase response of the laser 2. A wider or narrower angle range of output phase angles may be selected, based on the peak-to-peak voltage limitations of the driver circuit 16 and the phase response characteristic of the laser 2.

In order to limit the bandwidth requirements of downstream components, complex signal trajectories crossing very near the origin (which are equivalent to nearly instantaneous phase changes of up to 180 degrees) should be prevented by suitable scaling and clipping operations. For example, signal trajectories passing very near the origin can be eliminated by applying an offset to the signal such that it is moved away from the origin. In addition, a scaling factor may be applied to the Cartesian coordinate sample values I(n) and Q(n) so as to avoid maximum output amplitude values of greater than the maximum laser output.

In combination, the above-described scaling operations yield polar coordinate target values S(n) and P(n) concentrated within the dashed line 34 of FIG. 5d. The shaded region 36 of FIG. 5d represents values that are attainable by the laser 2 and amplitude modulator 4 when drive signal peak-to-peak voltage and current limitations are in place, and the laser and modulator are biased at appropriate points of their respective response curves. Polar coordinate values S(n) and P(n) lying outside of the shaded region are removed by clipping, in a manner well known in the art. Provided that the amount of such clipping is small, the resulting distortion of the E-field will not unduly disrupt operation of the system.

Once the polar coordinate target values S(n) and P(n) have been determined, the non-linear compensator 22 computes the corresponding laser drive signal value $V_P(n)$, using equation 1 above. Digital-to-analog conversion of successive laser drive signal values $V_P(n)$ generates the required drive signal $V_P(t)$ which yields the desired phase φ(t) of the CW carrier 6' emitted by the laser 2. The associated amplitude modulation value A(n) of the laser output 6' corresponding to the computed drive signal value $V_P(t)$ is then calculated using equation 2, and the compensated amplitude modulation value S'(n) determined using equation 3. Once the compensated amplitude modulation value S'(n) has been determined, the non-linear compensator 22 computes the corresponding amplitude drive signal level $V_S(n)$, using, for example, a simple look-up table function. Digital-to-analog conversion of successive amplitude drive signal values $V_S(n)$ generates the required drive signal $V_S(t)$ which yields the desired amplitude S(t) of the communications signal 8 output from the amplitude modulator 4.

As mentioned previously, the laser phase and amplitude transfer functions $T_P$ and $T_S$ can be derived adaptively. The embodiment of FIG. 4 implements a possible system for performing this function. As shown in FIG. 4, the CW signal 6' emitted by the laser 2 is tapped, for example, using a conventional 20 dB optical coupler 38, and the tapped signal 40 monitored (at 42) to detect, as a function of time, the output amplitude A(t) and phase φ(t). Various known optical spectrum analysers may be used for this purpose. The monitored amplitude A(t) and phase φ(t) can then be sampled to yield corresponding digital amplitude A(n) and phase φ(n) sample values. Preferably, the sampling rate will be selected to satisfy the Nyquist criterion at the line rate of the optical communications signal 8. Still more preferably, the monitored amplitude and phase A(t) and φ(t) are sampled at a timing corresponding to the drive signal values $V_P(n)$ and $V_S(n)$ output by the non-linear compensator 22. When propagation delays are properly accounted for, synchronizing the amplitude and phase sampling with the nonlinear compensator operation in this manner facilitates comparison between the phase and amplitude sample values A(n) and Øn), the target phase P(n), and the laser drive signal value $V_P(n)$.

In any event, the phase and amplitude sample values A(n) and φ(n) are passed to a processor 44, which also receives the target phase values P(n) and the laser drive signal values $V_P(n)$ calculated by the non-linear compensator 22. On the basis of these inputs, the processor 44 uses the target and sampled phase values P(n) and Øn) to determine the phase transfer function $T_P$; and uses the laser drive signal values $V_P(n)$ and sampled amplitude values A(n) to determine the amplitude transfer function $T_A$. The transfer functions $T_P$ and $T_A$ are then supplied to the non-linear compensator 22, for use in calculation of the drive signal values $V_P(n)$ and $V_S(n)$ as described above.

In order to facilitate signal processing and computation of the transfer functions $T_P$ and $T_A$, phase and amplitude sample values φ(n) and A(n) generated within a predetermined time interval may be stored in a memory (not shown). The corresponding target phase P(n) and laser drive signal values $V_P(n)$ can also be buffered in a memory (not shown). This enables phase and amplitude sample values φ(n) and A(n) representing the optical signal 6' emitted by the laser 2 within the predetermined time interval to be recorded at high speed (i.e. at about double the line rate), along with the corresponding target phase P(n) and laser drive signal values $V_P(n)$. Subsequent processing of the sample values, and computation of the transfer functions $T_p$ and $T_A$ can then be performed at a speed appropriate to the processor 44.

The arrangement of FIG. 4 is advantageous in that it permits the phase and amplitude transfer functions $T_P$ and $T_A$ to be updated, as desired. For example it may be desirable to update the transfer functions in response to changes in component parameters. Thus the system of the invention can accommodate performance drift due, for example, to temperature changes or component aging. Computation of new transfer functions may be triggered by a control signal (e.g. from a network management system), or may be automatically performed on a periodic basis, as desired.

In the embodiment of FIGS. 2-5, the laser 2 is directly driven to generate an optical signal 6' having a desired phase φ(t), and an amplitude A(t) which is an artefact of the laser amplitude transfer function $T_S$. An external amplitude modulator 4 is then driven to control the signal amplitude, and thereby produce the optical communications signal 8 having desired phase φ(t) and amplitude S(t). This arrangement enables an arbitrary modulation of the communications signal 8 within the complex plane. However, for phase-shift keying (PSK) and Quadrature phase-shift keying (QPSK) encoding schemes, data content of the optical signal 8 is contained within the phase component φ(t) of the communications signal 8. This suggests the possibility of eliminating the amplitude modulator 4, and using the directly driven laser 2 to generate the communications signal 8. The resulting communications signal 8 will contain the correct phase φ(t) needed for PSK or QPSK encoded data, and consequential amplitude excursions that do not encode any information. At the receiver-end of the optical link, the phase (or equivalently, the frequency) component of the inbound signal is detected, and the amplitude component A(t) ignored. This operation is illustrated with reference to FIGS. 6 and 7.

Figure 6A:
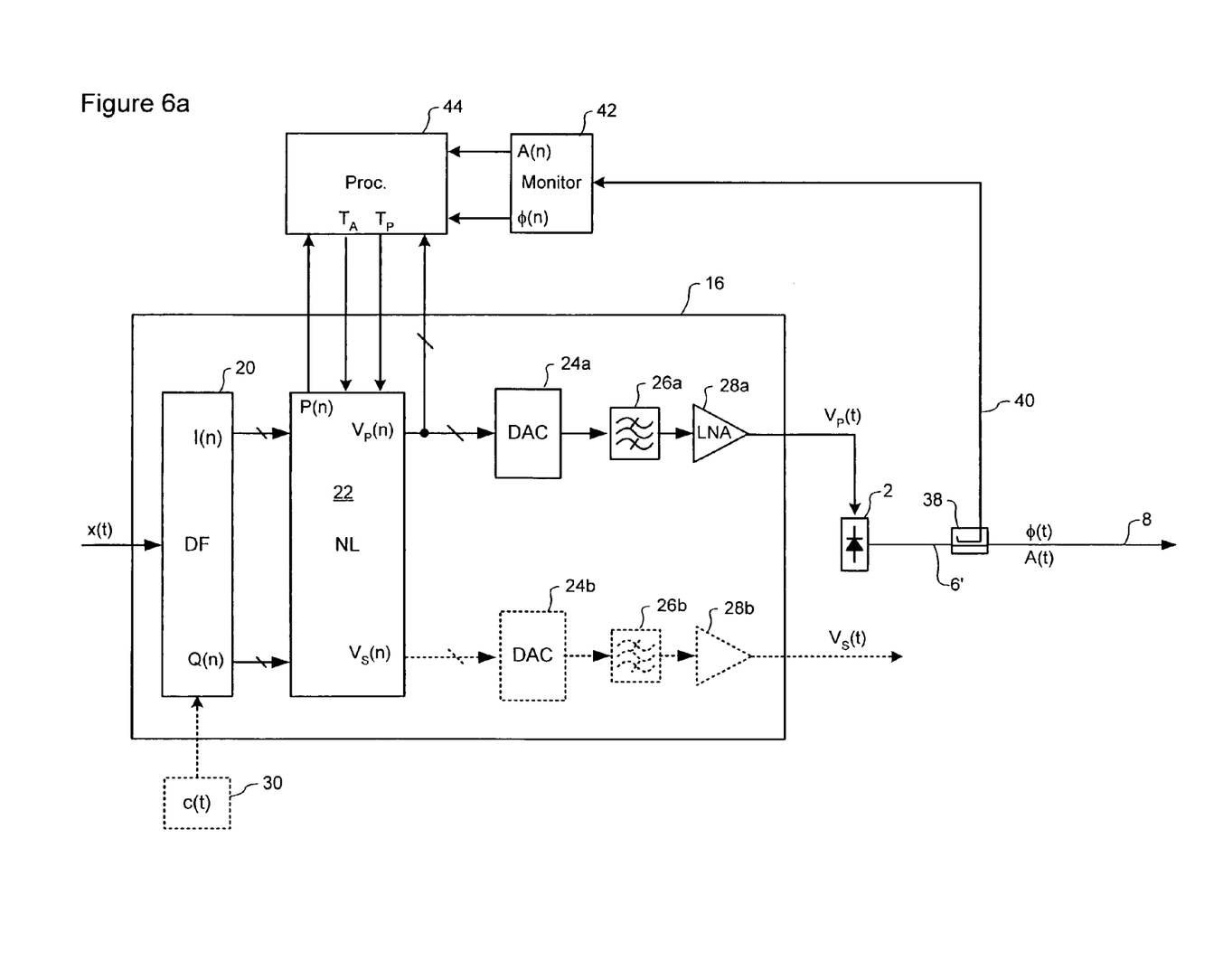
FIG. 6 illustrates principal components and operation of a complex communications signal synthesizer in accordance with another embodiment of the present invention.

As may be seen in FIG. 6a, a system in accordance with this second embodiment of the invention can use the same complex driver circuit 16 and semiconductor laser 2 described above with reference to FIGS. 2-5. In this case, however, the amplitude modulator 4 is omitted, so that only the phase drive signal $V_P(t)$ is used. The amplitude drive signal $V_S(t)$, which was used in the embodiment of FIGS. 2-5 to drive the amplitude modulator 4, is not used. Consequently, the corresponding signal path, encompassing DAC 24b, band-pass filter 26b and low-noise amplifier 28b can be omitted, as indicated by the dotted lines in FIG. 6a. In other respects, however, the operation of the complex driver circuit 16 and laser 2 are substantially identical to that described above.

Figure 7A:
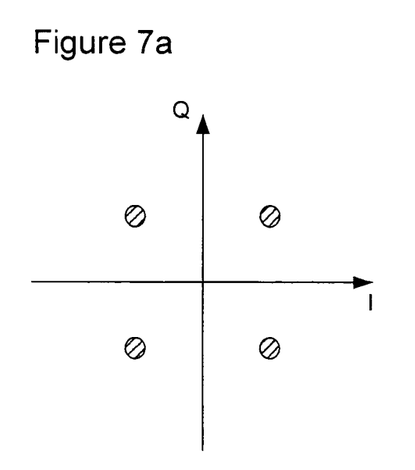
FIGS. 7a-7c schematically illustrate operation of the embodiment of FIG. 6.

Thus, the digital filter 20 generates successive sample values I(n) and Q(n), which represent the desired communication signal E-Field in Cartesian (In-phase and Quadrature) coordinates, at a sample rate which is about double the bit-rate of the input signal x(t). FIG. 7a shows QPSK encoded data in the complex I-Q plane. As described above, implementation of an impairment compensation function c(t) 30 by the digital filter 20 means that the E-field E(t) exhibits arbitrary excursions in the I-Q plane, as may be seen in FIG. 7b in which the shaded region 32 represents the range of I(n) and Q(n) values generated by the digital filter 20.

The non-linear compensator 22 processes the sample values I(n) and Q(n) to obtain successive drive signal values $V_P(n)$. Thus, the non-linear compensator 22 converts the Cartesian coordinate sample values I(n) and Q(n) into corresponding polar coordinate values P(n) and S(n), respectively representing the target phase P(n) and amplitude S(n) of the communications signal 8. These values are then scaled and clipped, as described above, in order to limit the drive voltage (and current) requirements of downstream components (primarily the DAC 24 and laser 2). These operations result in the range of sample values I(n) and Q(n) being limited to the region 34 shown in FIG. 7c.

Once the polar coordinate target values S(n) and P(n) have been determined, the non-linear compensator 22 computes the corresponding laser drive signal value $V_P(n)$, using equation 1 above. Digital-to-analog conversion of successive laser drive signal values $V_P(n)$ generates the required drive signal $V_P(t)$ which yields the desired phase φ(t) of the CW carrier 6' emitted by the laser 2. In the embodiment of FIGS. 2-5, both phase P(n) and amplitude S(n) values are used to generate corresponding phase and amplitude drive signals $V_P(t)$ and $V_S(t)$. In the embodiment of FIGS. 6 and 7, only the phase drive signal $V_P(t)$ is used. This is equivalent to modulating the E-field using a unit vector 46 (i.e. a vector having a fixed amplitude, nominally equal to 1) and the desired phase φ(t), as may be seen in FIG. 7c. This means that the CW optical carrier 6' (communications signal 8) will have the desired phase φ(t), but an (erroneous) amplitude A(t) which is a product of the laser amplitude transfer function $T_S$.

Figure 6B:
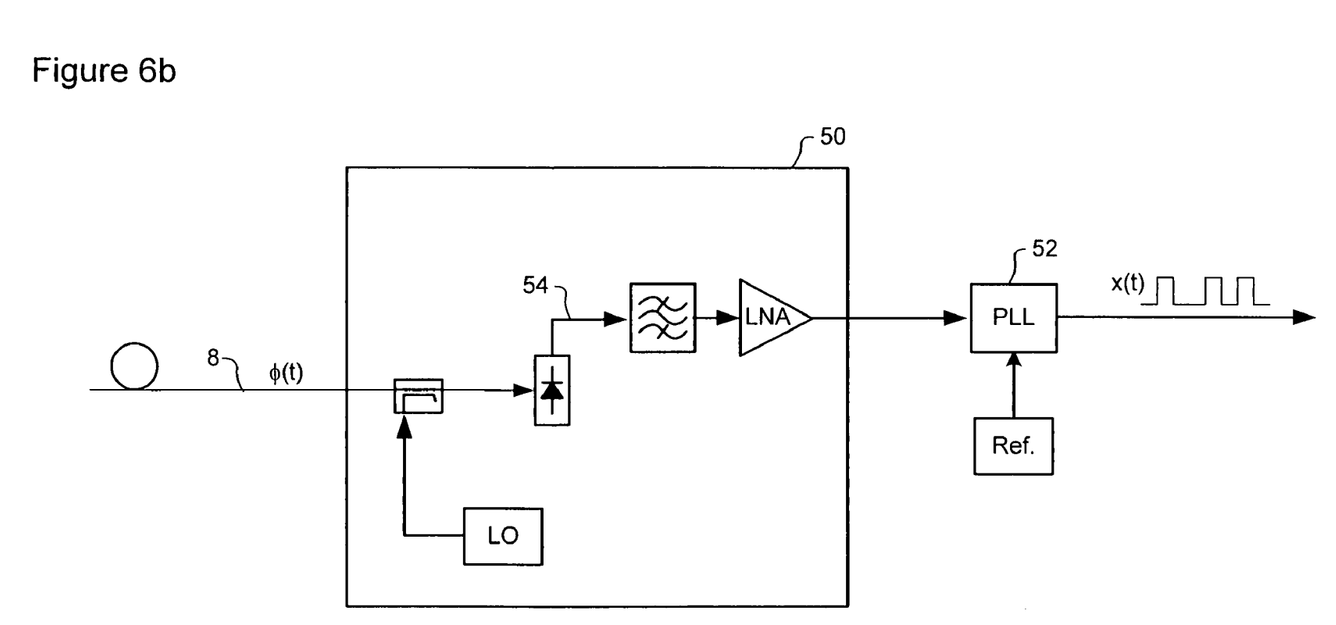
Figure 7B:
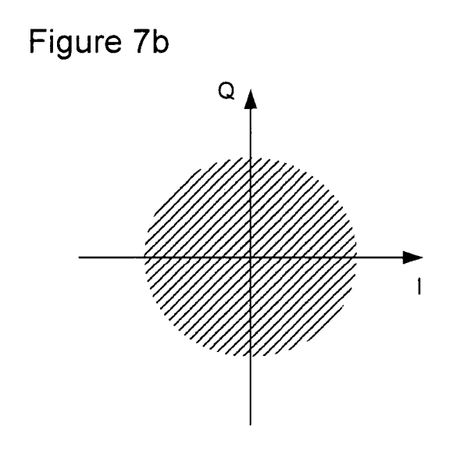
Figure 7C:
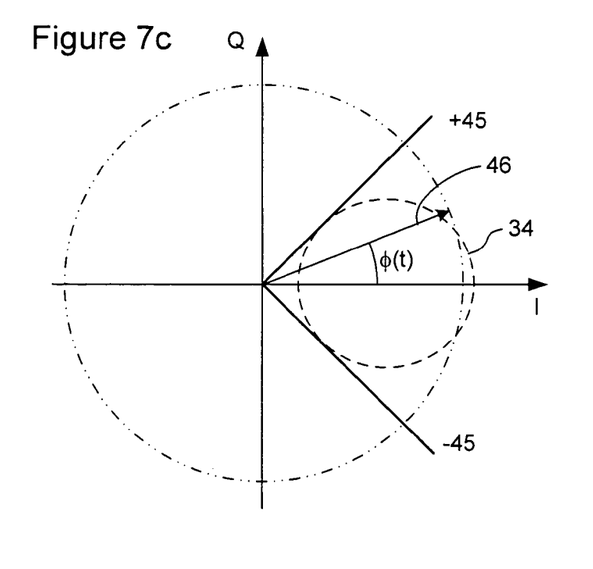

As shown in FIG. 6b, at a receiving end of an optical link, the inbound communications signal 8 is received by a conventional coherent optical receiver 50 cascaded with a frequency detector 52 such as a phase locked loop (PLL): The coherent optical receiver 50 operates in a known manner to convert a desired wavelength channel to a predetermined intermediate frequency (IF) signal 54, which can be filtered to remove out-of-band noise and amplified in a known manner. The frequency detector 52 detects frequency excursions of the IF signal 54, and thus the PSK (or QPSK) encoded data. This operation is (subject to the usual device limitations known in the art) independent of the amplitude of the received signal 8, so the fact that the amplitude component A(t) at the output of the laser 2 is "erroneous" does not prevent successful detection of PSK or QPSK encoded data within the communications signal 8.

In the foregoing description, a phase drive signal $V_P(t)$ is derived for driving the laser to generate an optical carrier signal with a desired phase φ(t). An amplitude drive signal $V_S(t)$ is then derived for driving the amplitude modulator 4 to impose a desired amplitude S(t) onto the optical carrier signal 6' generated by the laser. In the later case, the amplitude modulation S'(t) that must be impressed onto the optical signal 6' by the amplitude modulator is obtained by adjusting the target amplitude modulation S(t) to compensate for amplitude modulation A(t) of the optical signal 6' due to the laser amplitude transfer function $T_A$. The implicit assumption here is that the amplitude modulator 4 is driven in such a way that it does not impress any phase modulation on the optical carrier signal 6'.

In the case of a dual-branch (or dual drive) Mach-Zehnder modulator, this assumption is generally valid. However, a single-branch Mach-Zehnder modulator (and some other types of amplitude modulators) will normally impose both a phase and an amplitude modulation. Those of ordinary skill in that art will recognise, however, that any such "phase noise" introduced by the amplitude modulator may be cancelled by deriving the phase drive signal $V_P(t)$ using an adjusting the target phase modulation φ'(t) in a manner directly analogous to that described above for cancelling the "amplitude noise" A(t) introduced by the laser amplitude transfer function $T_A$.

The embodiment(s) of the invention described above is(are) intended to be exemplary only. The scope of the invention is therefore intended to be limited solely by the scope of the appended claims.

We claim:

1. A method of synthesizing an optical signal using a directly driven laser for transmission through a link of an communications network, the method comprising steps of:
   calculating respective in-phase and quadrature sample values I(n) and Q(n) of a target optical E-field envelope;
   processing the in-phase and quadrature sample values I(n) and Q(n) to calculate corresponding amplitude and phase values S(n) and P(n) respectively representative of target amplitude and phase S(t) and P(t) of the target optical E-field envelope;
   scaling the amplitude and phase values S(n) and P(n) to obtain corresponding scaled amplitude and phase values;
   generating a phase drive signal $V_P(t)$ based on the scaled phase values and a phase transfer function $T_P$ of the laser, the phase transfer function $T_P$ being defined such that applying the phase drive signal $V_P(t)$ to the laser will yield an optical signal having an output phase φ(t) corresponding to the target phase P(t); and
   driving the laser using the phase drive signal to generate the optical signal;
   wherein scaling the phase values P(n) limits the output phase φ(t) of the optical signal to a predetermined range of angles.

2. A method as claimed in claim 1, wherein the step of generating the phase drive signal $V_P(t)$ comprises steps of:
   calculating respective phase drive signal values $V_P(n)$ corresponding to each target phase value P(n); and
   converting each phase drive signal value $V_P(n)$ into a respective analog drive signal level.

3. A method as claimed in claim 2, wherein the step of calculating respective phase drive signal values $V_P(n)$ comprises steps of:
   preliminarily deriving the phase transfer function $T_P$ of the laser; and
   during run-time, using the phase transfer function $T_P$ to calculate each successive phase drive signal value $V_P(n)$.

4. A method as claimed in claim 3, wherein the step of deriving the phase transfer function $T_P$ comprises a step of deriving a finite impulse response (FIR) filter function representative of an inverse impulse response of the laser.

5. A method as claimed in claim 1, further comprising steps of:
   generating an amplitude drive signal $V_S(t)$ based on the scaled amplitude values, the phase drive signal $V_P(t)$ and an amplitude transfer function $T_A$ of the laser; and
   driving an amplitude modulator using the amplitude drive signal $V_S(t)$ to modulate an amplitude of the optical signal generated by the laser;
   wherein scaling the amplitude values S(n) limits the target amplitude S(t) to an amplitude corresponding with minimum and maximum points of an amplitude modulator response.

6. A method as claimed in claim 5, wherein the step of generating the amplitude drive signal $V_S(t)$ comprises steps of:
   determining an expected amplitude modulation A(t) of the optical signal generated by the laser based on the phase drive signal $V_P(t)$ and an amplitude transfer function $T_A$ of the laser;
   computing a compensated target amplitude S'(t) based on the target amplitude S(t) and the expected amplitude modulation A(t); and
   generating the amplitude drive signal $V_S(t)$ based on the scaled amplitude values and the compensated target amplitude S'(t).

7. A method as claimed in claim 6, wherein the step of determining an expected amplitude modulation A(t) comprises steps of:
   preliminarily deriving the amplitude transfer function $T_A$ of the laser; and
   during run-time, using the amplitude transfer function $T_A$ to calculate the expected amplitude modulation A(t).

8. A method as claimed in claim 1, wherein the predetermined range of phase angles has a span of less than 180 degrees.

9. A method as claimed in claim 8, wherein the predetermined range of phase angles has a span of about 90 degrees.

10. A method as claimed in claim 1, wherein the step of deriving phase and amplitude values comprises a step of offsetting the calculating phase and amplitude values so as to substantially eliminate trajectories proximal to an origin.

* * * * *